United States Patent
Zhao et al.

(10) Patent No.: US 11,860,976 B2
(45) Date of Patent: Jan. 2, 2024

(54) DATA PROCESSING METHOD AND DEVICE, CLASSIFIER TRAINING METHOD AND SYSTEM, AND STORAGE MEDIUM

(71) Applicant: TENCENT TECHNOLOGY (SHENZHEN) COMPANY LIMITED, Shenzhen (CN)

(72) Inventors: Wei Zhao, Shenzhen (CN); Yabing Feng, Shenzhen (CN); Yu Liao, Shenzhen (CN); Junbin Lai, Shenzhen (CN); Haixia Chai, Shenzhen (CN); Xuanliang Pan, Shenzhen (CN); Lichun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1207 days.

(21) Appl. No.: 16/382,700

(22) Filed: Apr. 12, 2019

(65) Prior Publication Data
US 2019/0236412 A1    Aug. 1, 2019

Related U.S. Application Data

(63) Continuation of application No. PCT/CN2017/106265, filed on Oct. 16, 2017.

(30) Foreign Application Priority Data

Oct. 18, 2016    (CN) .......................... 201610912823.0

(51) Int. Cl.
*G06F 18/21*    (2023.01)
*G06F 18/214*    (2023.01)
(Continued)

(52) U.S. Cl.
CPC .......... *G06F 18/217* (2023.01); *G06F 18/214* (2023.01); *G06F 18/2115* (2023.01);
(Continued)

(58) Field of Classification Search
CPC .. G06K 9/6257; G06K 9/6218; G06K 9/6231; G06K 9/6256; G06K 9/6259; G06K 9/6267; G06K 9/6262
See application file for complete search history.

(56) References Cited

U.S. PATENT DOCUMENTS

| | | | |
|---|---|---|---|
| 9,275,345 B1 * | 3/2016 | Song | ...................... G06N 20/00 |
| 2008/0071708 A1 * | 3/2008 | Dara | ...................... G06F 18/23 |
| | | | 706/20 |

(Continued)

FOREIGN PATENT DOCUMENTS

| | | |
|---|---|---|
| CN | 104750875 A | 7/2015 |
| CN | 104820687 A | 8/2015 |

(Continued)

OTHER PUBLICATIONS

The World Intellectual Property Organization (WIPO) International Search Report for PCT/CN2017/106265 dated Feb. 24, 2018 5 Pages (including translation).

(Continued)

*Primary Examiner* — Jianxun Yang
(74) *Attorney, Agent, or Firm* — ANOVA LAW GROUP, PLLC

(57) ABSTRACT

A data processing method and device are provided. The method includes: extracting a plurality of data sets from unlabeled data; and for each data set, creating a plurality of sample sets by assigning labels to data samples in the data set, respectively training, for each sample set created from the data set, a classifier by using the sample set and labeled data, obtaining a sample set that corresponds to a trained (Continued)

classifier with the highest performance, and adding the obtained sample set to a candidate training set. Each sample set includes the first preset number of data samples with respective labels, the labels of the data samples in each sample set constitutes a label combination, and label combinations corresponding to different sample sets are different from each other. The method also includes adding a second preset number of sample sets in the candidate training set to the labeled data.

20 Claims, 5 Drawing Sheets

(51) Int. Cl.
   *G06F 18/23*      (2023.01)
   *G06F 18/24*      (2023.01)
   *G06F 18/2115*    (2023.01)

(52) U.S. Cl.
   CPC ...... *G06F 18/2148* (2023.01); *G06F 18/2155* (2023.01); *G06F 18/23* (2023.01); *G06F 18/24* (2023.01)

(56) References Cited

U.S. PATENT DOCUMENTS

2011/0295778 A1* 12/2011 Homma ............... G06K 9/6259
                                                        706/12
2015/0206069 A1*  7/2015 Beers .................... G06N 20/00
                                                        706/12

FOREIGN PATENT DOCUMENTS

| CN | 105023006 A | 11/2015 |
| CN | 105303198 A | 2/2016 |
| CN | 106650780 A | 5/2017 |

OTHER PUBLICATIONS

Xiaojin Zhu, "Tutorial on Semi-Supervised Learning", Theory and Practice of Computational Learning Chicago, 2009, http://pages.cs.wisc.edu/~jerryzhu/pub/sslchicago09.pdf 227 Pages.
T. Madl, "Semi-supervised learning frameworks for Python", https://github.com/tmadl/semisup-learn 5 Pages.
Su-Lei Nian, "Semi-Supervised Support Vector Machine Survey", http://lamda.nju.edu.cn/huangsj/dm11/files/niansl.pdf 9 Pages.

* cited by examiner

DATA PROCESSING METHOD AND DEVICE, CLASSIFIER TRAINING METHOD AND SYSTEM, AND STORAGE MEDIUM

CROSS REFERENCES TO RELATED APPLICATIONS

This application is a continuation application of PCT Patent Application No. PCT/CN2017/106265, filed on Oct. 16, 2017, which claims priority to Chinese Patent Application No. 201610912823.0 entitled "DATA PROCESSING METHOD AND DEVICE, CLASSIFIER TRAINING METHOD AND SYSTEM" and filed on Oct. 18, 2016 with the Chinese Patent Office, the entire contents of both of which are incorporated herein by reference.

FIELD OF TECHNOLOGY

The embodiments of the present disclosure relate to the technical field of computers, and in particular to a data processing method and device, a classifier training method and system, and a storage medium.

BACKGROUND OF THE DISCLOSURE

Every day on the Internet, a lot of information is produced, and it is expanding at an alarming rate every day. A large amount of data is generated every moment on social networks, news reviews, BBS, blogs, chat rooms, really simple syndication news (RSS), etc. In view of this, based on the field of natural language understanding, the classification of the massive data is achieved through classification algorithms, which is of broad and far-reaching significance for information regulation. However, the speed of analysis and processing of the information by humans is far from satisfying the requirements. Therefore, people have begun to study methods of statistics and learning to automatically process and classify large amounts of information.

SUMMARY

The embodiments of the present disclosure provide a data processing method and device, and a storage medium.

The data processing method proposed in the embodiments of the present disclosure includes: extracting, by a computing device, a plurality of data sets from unlabeled data, and for each data set, creating a plurality of sample sets by assigning labels to data samples in the data set. Each sample set includes the first preset number of data samples with respective labels, the labels of the data samples in each sample set constitutes a label combination, and label combinations corresponding to different sample sets are different from each other. The method also includes, for each data set, respectively training, for each sample set created from the data set, a classifier by using the sample set and labeled data; obtaining a sample set that corresponds to a trained classifier with the highest performance among the plurality of sample sets created from the data set; and adding the obtained sample set to a candidate training set. The method also includes adding, by the computing device, a second preset number of sample sets in the candidate training set to the labeled data.

The data processing device proposed in the embodiments of the present disclosure includes: one or more memories, and one or more processors. The one or more processors are configured to extract a plurality of data sets from unlabeled data, and for each data set, create a plurality of sample sets by assigning labels to data samples in the data set. Each sample set includes the first preset number of data samples with respective labels, the labels of the data samples in each sample set constitute a label combination, and label combinations corresponding to different sample sets are different from each other. The one or more processors are also configured to, for each data set, respectively train, for each sample set created from the data set, a classifier by using the sample set and labeled data; obtain a sample set that corresponds to a trained classifier with the highest performance among the plurality of sample sets created from the data set; and add the obtained sample set to a candidate training set. The one or more processors are also configured to add a second preset number of sample sets in the candidate training set to the labeled data.

The non-volatile computer-readable storage medium provided in the embodiments of the present disclosure stores a computer program capable of causing at least one processor to perform: extracting a plurality of data sets from unlabeled data, and for each data set, creating a plurality of sample sets by assigning labels to data samples in the data set. Each sample set includes the first preset number of data samples with respective labels, the labels of the data samples in each sample set constitutes a label combination, and label combinations corresponding to different sample sets are different from each other. The computer program also causes the at one least processor to perform: for each data set, respectively training, for each sample set created from the data set, a classifier by using the sample set and labeled data; obtaining a sample set that corresponds to a trained classifier with the highest performance among the plurality of sample sets created from the data set; and adding the obtained sample set to a candidate training set. The computer program also causes the at one least processor to perform: adding a second preset number of sample sets in the candidate training set to the labeled data.

DESCRIPTION OF EMBODIMENTS

The foregoing and other technical contents, features and effects of the embodiments of the present disclosure will be clearly presented from the following detailed description of preferred embodiments with reference to the drawings. Through the description of the specific embodiments, the technical means adopted by the embodiments of the present disclosure to achieve the intended purpose and the effects can be more deeply and specifically understood. However, the drawings are only for reference and explanation, and are not used for limiting the embodiments of the present disclosure.

Figure 6:
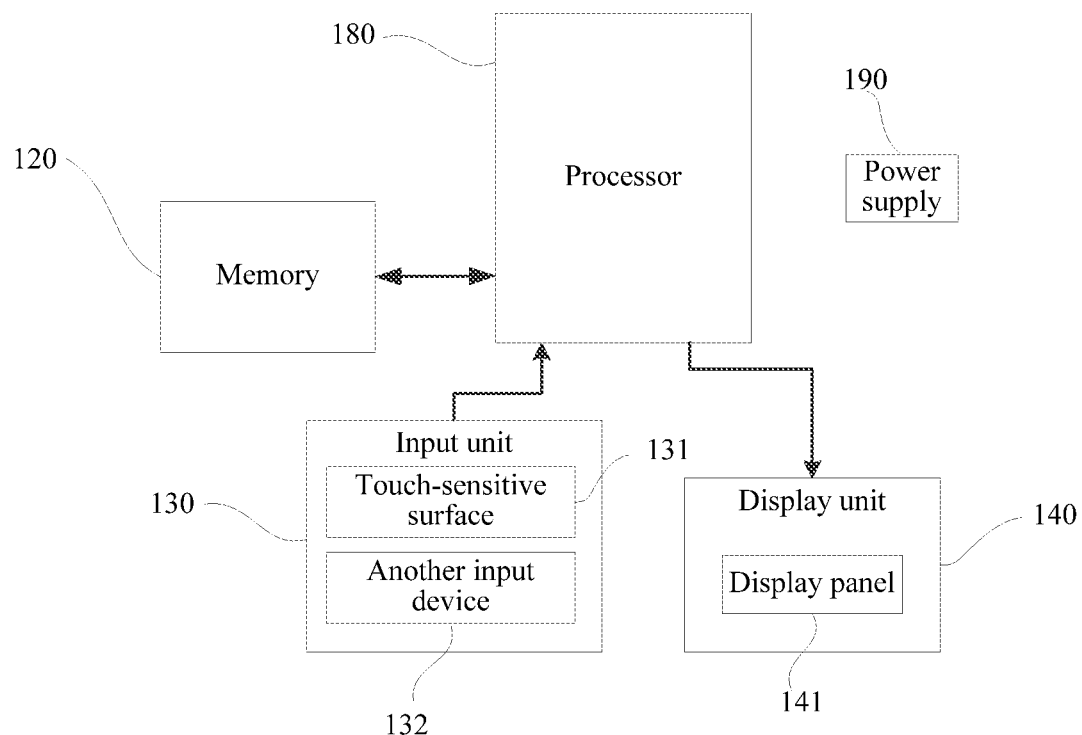
FIG. 6 is a schematic diagram of an application environment of a data processing method and device, a classifier training method and system according to the embodiments of the present disclosure.

The embodiments of the present disclosure relate to a data processing method and device, a classifier training method and system, which can be applied to a server. Referring to FIG. 6, FIG. 6 is a schematic diagram of an operating environment of the data processing method and device, the classifier training method and system. A server 1200 (or other electronic equipment, such as a user terminal) includes a memory 120 having one or more computer-readable storage media, an input unit 130, a display unit 140, a processor 180 including one or more processing cores, a power supply 190 and other components. A person skilled in the art may understand that the structure of the server shown in FIG. 6 does not constitute a limitation to the terminal and may include more components or fewer components than those shown in the figure, or some components may be combined, or a different component deployment may be used.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and a telephone book) created according to use of the server 1200, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical signal or track ball signal input related to the user setting and function control. Specifically, the input unit 130 may include a touch-sensitive surface 131 and another input device 132. The touch-sensitive surface 131, which may also be referred to as a touch screen or a touchpad, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. In some embodiments, the touch-sensitive surface 131 may include a touch detection apparatus and a touch controller. The touch detection apparatus detects a touch position of the user, detects a signal generated by the touch operation, and transfers the signal to the touch controller; the touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the server 1200. The graphical user interfaces may be constituted by a graph, a text, an icon, a video, or any combination thereof. The display unit 140 may include a display panel 141. In some embodiments, the display panel 141 may be configured by using a liquid crystal display (LCD), an organic light-emitting diode (OLED), and the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 11, the touch-sensitive surface 131 and the display panel 141 are used as two separate parts to implement input and output functions, in some embodiments, the touch-sensitive surface 131 and the display panel 141 may be integrated to implement the input and output functions.

The processor 180 is the control center of the server 1200, and is connected to various parts of the whole server 1200 by using various interfaces and lines. By running or executing the software program and/or module stored in the memory 120, and invoking data stored in the memory 120, the processor 180 performs various functions and data processing of the server 1200, thereby performing overall monitoring on the server 1200. In some embodiments, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The server 1200 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

The embodiments of the present disclosure are applicable to the case that there are few available modeling samples and many unlabeled data, such as data classification of a credit investigation warning system, a sentiment analysis system, etc., and the use of unlabeled data to improve the performances of classifiers.

Figure 1:
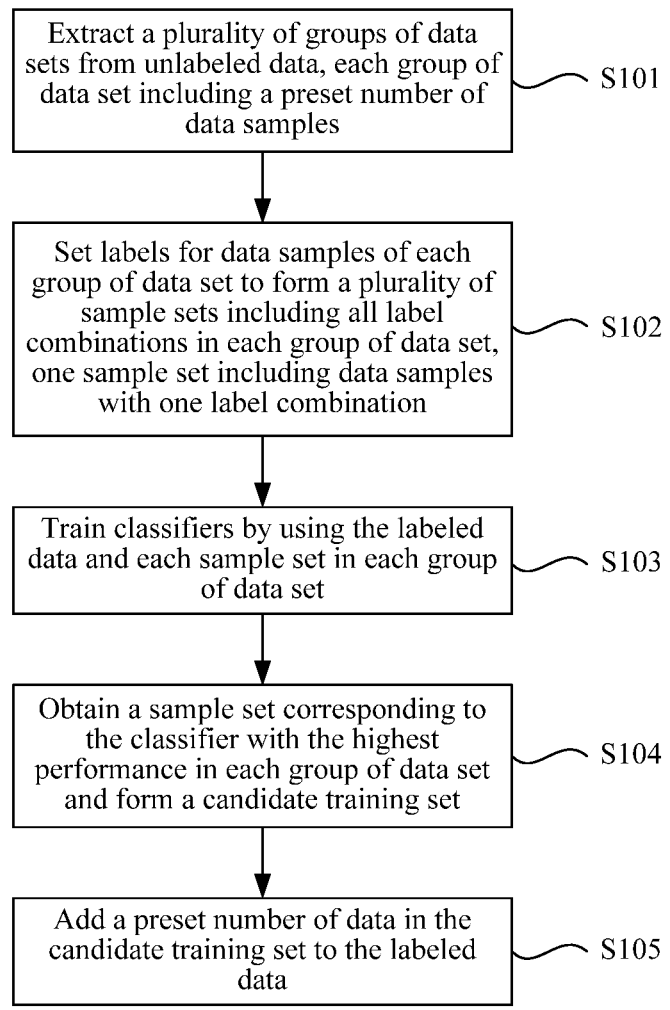
FIG. 1 is a flowchart of a data processing method according to the embodiments of the present disclosure.

The embodiment of the present disclosure provides a data processing method. The method may be executed by electronic equipment such as a server or a user terminal. Referring to FIG. 1, the data processing method of one embodiment includes:

S101: Extract a plurality of groups of data sets from unlabeled data, each group of data set including a preset number of data samples. For ease of distinction, the preset number here can be referred to as a first preset number. The meaning of each group of data set described above is actually each data set, so step S101 can be described as "extract a plurality of data sets from unlabeled data, each data set including a first preset number of data samples". The data sample can be a collection of various types of information, for example, in a credit investigation system, name, ID number, home address, work unit and other identification information, loan issuing bank, loan amount, loan term, repayment method, actual repayment record and other loan information, as well as card issuing bank, credit limit, repayment record and other credit card information can jointly constitute a data sample. The preset number can be set according to requirements, for example, each group of data set can include 10 data samples, that is, 10 data samples can be sequentially extracted from the unlabeled data to constitute a data set. Assuming that there is 100 data samples in the unlabeled data, then up to 10 groups of data sets can be extracted.

S102: Set labels for data samples of each group of data set to constitute a plurality of sample sets including all label combinations in each group of data set, one sample set including data samples with one label combination. The setting of the labels for the data samples needs to be based on the labels of labeled data. For example, if the labels of the labeled data are divided into two classes of labels, namely high-quality user labels and non-high-quality user labels, likewise, high-quality user labels and non-high-quality user labels are set for the data samples. The classes of the labels are set according to the needs of different systems. For example, in the credit investigation system, the labels can be divided into high-quality user labels and non-high-quality user labels according to the credit standing of users; and in a sentiment analysis system, the labels can be divided into positive labels and negative labels according to the semantic definition of public opinion information. Of course, the number of label classes is not limited to two, but for ease of description, the embodiments of the present disclosure are described by taking two label classes as an example.

The label combination refers to a combination of labels containing classes. Assuming there are two classes of labels, one data set includes 10 data samples, and the data samples in the data set are labeled randomly, then there are $2^{10}$, namely 1024 different label combinations. One sample set is composed of data samples with one label combination, that is, the data set includes 1024 sample sets. In other words, each of the 1024 sample sets created from the same data set include the same 10 data samples, and the label assignment for the 10 data samples of the 1024 sample sets are different from each other. In some embodiments, the sample sets created from a group of data set may exhaust all possible label combinations for the data samples in the group of data set. Below is a simple example for illustration:

Assuming that a data set Q includes two data samples {(user A), (user B)}, wherein (user A) and (user B) include the credit data of a user A and a user B, assuming that the labels are divided into high-quality user labels and non-high-quality user labels, then the data set Q is labeled to form four sample sets: {(User A, High-quality User), (User B, High-quality User)}, {(User A, High-quality User), (User B, Non-high-quality User)}, {(User A, Non-high-quality User), (User B, High-quality User)}, {(User A, Non-high-quality User), (User B, Non-high-quality User)}.

For an example in which there are two classes of labels and one data set includes 10 data samples, there are 1024 sample sets, each sample set includes 10 sample data, and the 1024 sample sets correspond to 1024 label combinations. For one data set, 1024 times of training is required in the subsequent steps, which is quite frequent. Therefore, for each data set, the sample sets formed may only correspond to some of the label combinations, and some label combinations with a relatively small probability can be temporarily aborted. Therefore, step S102 may also be described as: set at least one class of labels for data samples in each data set to create a plurality of sample sets, one sample set including the first preset number of data samples with respective labels, the labels of each data sample in each sample set constituting a label combination, the label combinations corresponding to different sample sets being different, and the label combinations corresponding to the multiple sample sets including some or all combinations of the at least one class of labels.

S103: Train classifiers by using the labeled data and each sample set in each group of data set. In other words, for each sample set created from a group of data set, a classifier is trained by a training set formed by the sample set and labeled data. For example, if 1024 sample sets are created from a group of data set, 1024 classifiers are trained respectively for each sample set using data of the sample set (i.e., randomly labeled data) and labeled data (i.e., data with known label). Step S102 has already labeled the sample sets, so the sample sets can be sequentially added to the labeled data to train the classifiers. The classifiers usually belong to a mathematical model, which includes a number of parameters, and the training of the classifiers is usually a process of adjusting the parameters in the classifiers, so as to make the classifiers have a better classification effect. If there are 10 groups of data sets and each group of data set includes 1024 sample sets, the classifiers need to be trained for 10240 times.

It is understandable that this step is to form training data by the labeled data and each sample set, so as to train the classifiers. For example, there are 10 data sets, each data set includes 1024 sample sets, that is, for each data set, training data is formed by the labeled data and each of the 1024 sample sets in the data set to train the classifiers. For each data set, 1024 times of training is performed, and finally 1024 classifiers are obtained. Therefore, step S103 may also be described as: "train a classifier by using each sample set in each data set and the labeled data".

S104: Obtain a sample set corresponding to a classifier with the highest performance in each group of data set and constitute a candidate training set. That is, obtain a sample set training a classifier with the highest performance in each data set and constitute a candidate training set. In other words, a sample set corresponding to a trained classifier with the highest performance among the sample sets created from the group of the data set is obtained, and the sample set is added to a candidate training set. After training the classifiers in step S103, the performances of the classifiers may be sorted so that the classifier with the highest performance in each group of data set is selected, and a corresponding sample set is obtained. The performances of the classifiers can be evaluated by an AUC (Area Under Curve) value. The AUC value represents the area under a ROC (Receiver Operating Characteristic) curve of the classifier. The larger the AUC value, the better the performance of the classifier. In other words, each AUC value corresponds to a sample set that is created from a group of data set. For example, a group of data set may include 1024 sample sets that are used to train 1024 classifiers, and 1024 AUC values of the classifiers may be obtained and compared to find one sample set corresponding to the highest AUC value among all classifiers trained in its own group. If there are 10 groups of data sets, then 10 sample sets corresponding to the classifiers with the highest performance can be selected. These 10 sample sets constitute the candidate training set. The candidate training set is a set of data samples which have the best classifier training effect.

For example, a trained classifier may be used to classify data samples in a testing set. The classification result predicted by the trained classifier may be compared with known labels of the data samples of the testing set to validate the performance of the classifier. The following describes the calculation of the AUC value of a two-class comparator:

First, define:

TN: A number of samples of the negative class as which the comparator predicts an actual negative class;

FN: A number of samples of the negative class as which the comparator predicts an actual positive class;

FP: A number of samples of the positive class as which the comparator predicts an actual negative class;

TP: A number of samples of the positive class as which the comparator predicts an actual positive class;

the positive class represents the concerned class, for example, if the purpose of the comparator is to find high-quality users, then high-quality users are the positive class.

Then, calculate the FPR (False Positive Rate) value and the TPR (True Positive Rate) value:

$$FPR=FP/(FP+TN)$$

$$TRP=TP/(TP+FN)$$

Then, obtain the ROC curve of the classifier with FPR as the horizontal axis and TPR as the vertical axis, and finally calculate the area under the ROC curve, namely the AUC value, so as to evaluate the performance of the classifier intuitively. For example, while label combinations are randomly assigned to data samples to create the sample sets, the classifier with the highest AUC value suggests that the corresponding sample set has the highest probability of being assigned with correctly classified labels for the data samples originally obtained from the unlabeled data.

S105: Add a preset number of data in the candidate training set to the labeled data. The preset number herein can also be set according to requirements, for example, the data in all the sample sets of the candidate training set can be added to the labeled data, or offline testing can be performed to select the data samples in the optimal sample sets in the candidate training set to be added to the labeled data. When the data samples of part of the sample sets in the candidate training set are selected to be added to the labeled data, the sample sets in the candidate training set may also be sorted according to the performances of the classifiers, and a certain number of sample sets are selected to be added to the labeled data (e.g., sample sets having AUC value higher than certain threshold are selected, or sample sets that are ranked among the first M ones in the sorted list are selected). In this way, each time the disclosed method is performed on the unlabeled data (e.g., extracting data samples from unlabeled data, randomly assigning label combinations to the data samples, training classifiers using the already-labeled data and the data samples with random assigned labels, comparing the trained classifiers to find a label combination that yields the best performance, confirming labels of the data samples based on the found label combination), the size of the labeled data can be increased, without manually creating labels for the unlabeled data. Further, after expanding the labeled data, a new classifier can be trained by using all the labeled data, the new classifier can be used to classify newly received data with higher accuracy/performance compared to the classifier trained from the labeled data before such expansion. By repeatedly performing the disclosed process, the labeled data can be expanded again and the new classifier can become more accurate.

Further, since the number of data samples in each group of data set extracted from the unlabeled data is fixed (e.g., first preset number N). The label combinations to be evaluated, i.e., the number of sample sets created from a group of data set, is fixed (e.g., $2^N$ if there are two classes of labels). The total number of sample sets can also be determined based on a number of groups of data sets (e.g., $M*2^N$ when the number of data sets is M). Accordingly, the time complexity is linear (e.g., according to the number of data sets) and predicable. In addition, in order to enhance classifier performance using large amount of unlabeled data and a small amount of labeled data, a conventional semi-supervised self-training method in prior art includes: training a classifier using the labeled data as a training set, using the trained classifier to classify the unlabeled data, adding certain classified samples with high confidence levels to the training set and deleting such samples from the unlabeled data to obtain an updated training set, retraining the classifier using the updated training set. The process is repeated until convergence, i.e., label prediction for the testing set are the same from the classifiers trained in two consecutive rounds. The conventional method is highly dependent on the initial data and the time complexity to reach convergence is unpredictable. In addition, when using the conventional self-training method, if an incorrectly-labeled sample is added to the training set, the mistake may get worse in the repeated retraining process and may cause other samples to be incorrectly labeled; when data distribution profile in the labeled data and the unlabeled data are different, a classifier trained by the labeled data may perform poorly in classifying the unlabeled data. On the other hand, the disclosed method can be applied to enhance classifier performance using large amount of unlabeled data and a small amount of labeled data with controllable complexity and reduced computing resources. When implementing the disclosed method, introducing the unlabeled data does not cause performance decline of the classifier, but rather enhances the performance of the classifier, since label combinations of the data samples are traversed and compared to find a label combination with highest performance which can be further incorporated to the labeled data.

In some embodiments, the classifiers trained and evaluated in steps S103-S104 are directed to find most proper labels for existing unlabeled data and to increase the generalization of an output classifier. The output classifier may be trained based on only and all of the labeled data (e.g., after one or more rounds of expansion using the disclosed process) and may be directed to be applied in practical applications to classify newly-received data.

In order to distinguish from the foregoing first preset number, the preset number in this step may be referred to as a second preset number. In other words, the step S105 may be described as "add a second preset number of sample sets in the candidate training set to the labeled data".

The data processing method of the disclosed embodiment fully considers the distribution of the unlabeled data. The essence is that the unlabeled data and the labeled data are put together for learning, so that the classifiers have better generalization ability (generalization ability refers to the adaptability of a machine learning algorithm to fresh samples).

The data processing method of the disclosed embodiment uses a large number of unlabeled data samples and adopts a heuristic traversal combined label idea, ensuring that the performances of the classifiers can be better after the introduction of the unlabeled samples.

Figure 2:
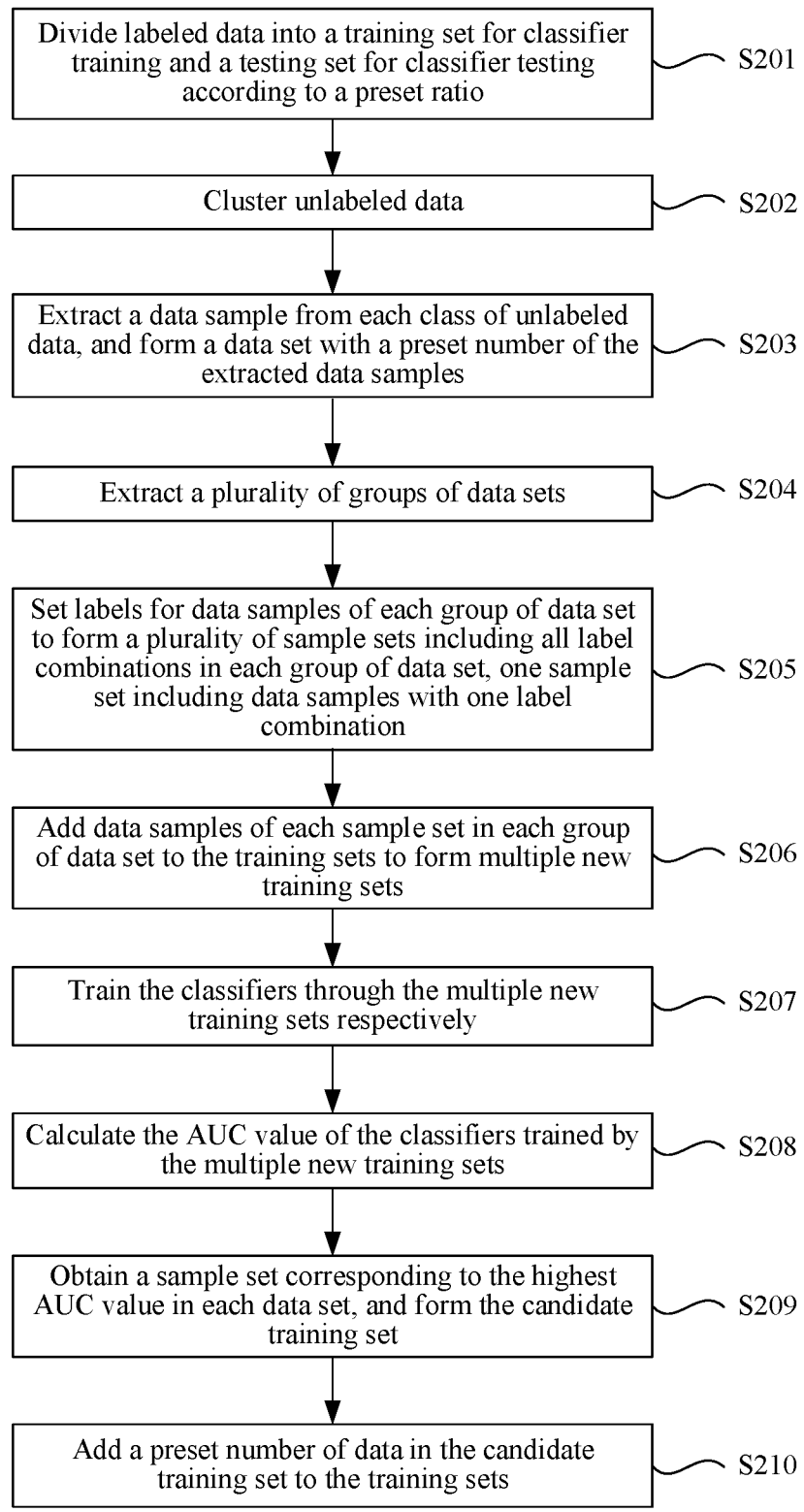
FIG. 2 is a flowchart of another data processing method according to the embodiments of the present disclosure.

Referring to FIG. 2, FIG. 2 is a flowchart of another data processing method according to the embodiments of the present disclosure, the data processing method in one embodiment may also be executed by electronic equipment such as a server and a user terminal, and specifically includes the following steps:

S201: Divide labeled data into a training set for classifier training and a testing set for classifier testing according to a preset ratio. The ratio may be set as 1:8 or 1:9 (e.g., 10% of the labeled data are placed in the training set and 90% of the labeled data are placed in the testing set) and the like according to requirements.

S202: Cluster unlabeled data. When the number of unlabeled samples which need to be processed is very large, in order to save computing resources, some embodiments may introduce a clustering algorithm. After clustering, the samples in each class/cluster are similar, and then the labels of data in each class/cluster are the same.

S203: Extract one or more data sample(s) from each class/cluster of unlabeled data, and form a data set with a preset number (namely a first preset number) of the extracted data samples. For example, after running the clustering algorithm, three clusters of the unlabeled data may be obtained. One data set may be formed with n1 samples from the first cluster of the unlabeled data, n2 samples from the second cluster of the unlabeled data, and n3 samples from the third cluster of the unlabeled data, where n1, n2, and n3 are on-negative integers, and the sum of n1, n2, and n3 equal the first preset number.

S204: Extract a plurality of groups of data sets. For example, the same process of Step S203 may be performed repeatedly to extract multiple groups of data sets from the clustered unlabeled data. For example, if the unlabeled data are clustered into two clusters, each group of data set may include one or more data samples from the first cluster and one or more data samples from the second cluster.

S205: Set labels for data samples of each group of data set to form a plurality of sample sets including all label combinations in each group of data set, one sample set including data samples with one label combination. The label assignment of a data sample in a group of data set may be performed based on the cluster where the data sample is from. For example, in one label combination of a sample set corresponding to one group of data set, all data samples from the first cluster are labeled as a first class, all data samples from the second cluster are labeled as a second class; in another label combination of another same sample set corresponding to the same group of data set, all data samples from the first cluster are labeled as the second class, all data samples from the second cluster are labeled as the first class. In other words, in one sample set, data samples from a same cluster are labeled with the same class, and data samples from different clusters are labeled with different classes. By clustering unlabeled data into clusters, the label assignment process does not need to traverse all label combinations for possible permutation of individual data samples in the data set (e.g., 3 classes of labels and 7 data samples produce $3^7=2187$ combinations). Rather, label combinations are assigned based on clusters (e.g., 3 classes of labels and 7 data samples from 2 clusters produce $3^2=9$ combinations). Clearly, with less label combinations to train classifiers, the computation resource can be saved and the training process can be expedited.

S206: Add data samples of each sample set in each group of data set to the training set to form multiple new training sets. For example, a current group of data set may include 7 data samples from two clusters. Accordingly, 9 sample sets are created from the group of data set with respective label combinations. Each of the new training set is formed by one of the 9 sample sets created from the current group of data set and the training set from the labeled data.

S207: Train the classifiers through the multiple new training sets respectively.

S208: Calculate the AUC value of the classifiers trained by the multiple new training sets.

S209: Obtain a sample set corresponding to the highest AUC value in each data set, and form the candidate training set.

S210: Add a preset number (namely a second preset number) of data in the candidate training set to the training sets.

The data processing method of the disclosed embodiment fully considers the distribution of the unlabeled data. The essence is that the unlabeled data and the labeled data are put together for learning, so that the classifiers have better generalization ability.

The data processing method of the disclosed embodiment uses a large number of unlabeled data samples and adopts a heuristic traversal combined label idea, ensuring that the performances of the classifiers can be better after the introduction of the unlabeled samples.

The data processing method of the disclosed embodiment proposes an algorithm which combines clustering with semi-supervising for the situation when the number of unlabeled data is too large, greatly reducing the time complexity of classifier training.

One embodiment proposes a classifier training method. The classifier training method includes: firstly, repeatedly obtain data samples from unlabeled data and adding the data samples to labeled data by using a data processing method; and training classifiers by using the labeled data including the data samples after adding the data samples to the labeled data each time. The data processing method is the same as that of Embodiment 1 or Embodiment 2, which will not be described herein.

The classifier training method of the disclosed embodiment uses a large number of unlabeled data samples and adopts a heuristic traversal combined label idea, ensuring that the performances of the classifiers can be better after the introduction of the unlabeled samples. Different from a traditional semi-supervised model, the classifier training method of the disclosed embodiment does not consider the accuracy of specific labeling, and only considers whether the distribution of unlabeled samples can be used to improve the performances of the classifiers, it is guaranteed that the introduction of unlabeled data will not cause the deterioration of the performances of the classifiers, and the unlabeled data can be well used to improve the model classification effect. Therefore, the classifier training method of the disclosed embodiment is particularly suitable for a system which has a large number of unlabeled samples and an insufficient number of labeled samples. For example, the classifier training method of the disclosed embodiment can be applied to a social credit investigation warning model. The social credit investigation warning model may be used to classify whether a client is a high quality user or a non-high-quality user. The number of positive and negative samples may be imbalanced since majority of users may not have overdue bills and only a small percentage of users may default and be flagged as non-high quality users. Distribution of positive samples and negative samples in the labeled data may be very different from that in the unlabeled data.

For example, a large portion of the labeled data may be non-high-quality users while the unlabeled data may mostly include high quality users. A lot of unlabeled data which is not utilized during the construction of the credit investigation warning model can be fully utilized to improve the performances of the classifiers, which further improves the ability of a bank to control credit and loan customers. In addition, manual labeling of samples is not required, thus eliminating the cost of manual labeling.

Figure 3:
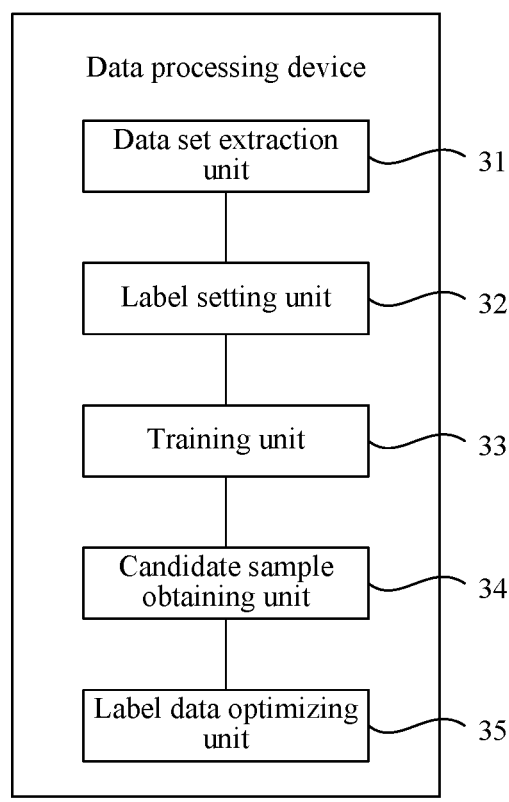
FIG. 3 is a structure diagram of a data processing device according to the embodiments of the present disclosure.

One embodiment provides a data processing device, which may be electronic equipment such as a server or a user terminal. The data processing device is configured to process labeled data and unlabeled data by training classifiers. Referring to FIG. 3, the data processing device of one embodiment includes:

one or more memories, and one or more processors, the one or more memories storing one or more instruction modules configured to be executed by the one or more processors, and the one or more instruction modules including:

a data set extraction unit 31, a label setting unit 32, a training unit 33, a candidate sample obtaining unit 34, and a label data optimizing unit 35.

The data set extraction unit 31 is configured to extract a plurality of groups of data sets from unlabeled data, each group of data set including a preset number (namely a first preset number) of data samples. That is, extract a plurality of data sets from unlabeled data, each data set including a first preset number of data samples. The data sample may be a collection of various types of information. The preset number can be set as needed. For example, each group of data set can include 10 data samples, that is, 10 data samples can be sequentially extracted from the unlabeled data to constitute a data set. Assuming that there is 100 data samples in the unlabeled data, then up to 10 groups of data sets can be extracted.

The label setting unit 32 is configured to set labels for data samples of each group of data set to constitute a plurality of sample sets including all label combinations in each group of data set, one sample set including data samples with one label combination. Assuming there are two classes of labels, one data set includes 10 data samples, and the data samples in the data set are labeled randomly, then there are $2^{10}$, namely 1024 different label combinations. One sample set is composed of data samples with one label combination, that is, the data set includes 1024 sample sets. That is, setting at least one class of labels for data samples in each data set to create a plurality of sample sets, one sample set including the first preset number of data samples with respective labels, the labels of each data sample in each sample set constituting a label combination, the label combinations corresponding to different sample sets being different, and the label combinations corresponding to the plurality of sample sets including some or all combinations of the at least one class of labels.

The training unit 33 is configured to train the classifiers by using the labeled data and each sample set in each group of data set. That is, train a classifier by using each sample set in each data set and the labeled data.

Since the label setting unit 32 has already labeled the sample sets, the sample sets can be sequentially added to the labeled data to train the classifiers. If there are 10 groups of data sets and each group of data set includes 1024 sample sets, the classifiers need to be trained for 10240 times.

The candidate sample obtaining unit 34 is configured to obtain a sample set corresponding to the classifier with the highest performance in each group of data set and constitute a candidate training set. That is, obtain a sample set training the classifier with the highest performance in each data set and forming a candidate training set. After the classifiers are trained by the training unit 33, the performances of the classifiers trained by the data in each group of data set may be sorted, so that the classifier with the highest performance in each group of data set is selected, and a corresponding sample set is obtained. The performances of the classifiers can be evaluated by the AUC value. The larger the AUC value, the better the performance of the classifier. If there are 10 groups of data sets, then 10 sample sets corresponding to the classifiers with the highest performance can be selected. These 10 sample sets constitute the candidate training set. The candidate training set is a set of data samples which have the best classifier training effect.

The label data optimizing unit 35 is configured to add a preset number of data in the candidate training set to the labeled data, that is, add a second preset number of sample sets in the candidate training set to the labeled data. The preset number herein can also be set according to requirements, for example, the data in all the sample sets of the candidate training set can be added to the labeled data, or offline testing can be performed to select the data samples in the optimal sample sets in the candidate training set to be added to the labeled data. When the data samples of part of the sample sets in the candidate training set are selected to be added to the labeled data, the sample sets in the candidate training set may also be sorted according to the performances of the classifiers, and a required number of sample sets are selected to be added to the labeled data.

The data processing method of the disclosed embodiment fully considers the distribution of the unlabeled data. The essence is that the unlabeled data and the labeled data are put together for learning, so that the classifiers have better generalization ability (generalization ability refers to the adaptability of a machine learning algorithm to fresh samples).

The data processing method of the disclosed embodiment uses a large number of unlabeled data samples and adopts a heuristic traversal combined label idea, ensuring that the performances of the classifiers can be better after the introduction of the unlabeled samples.

Figure 4:
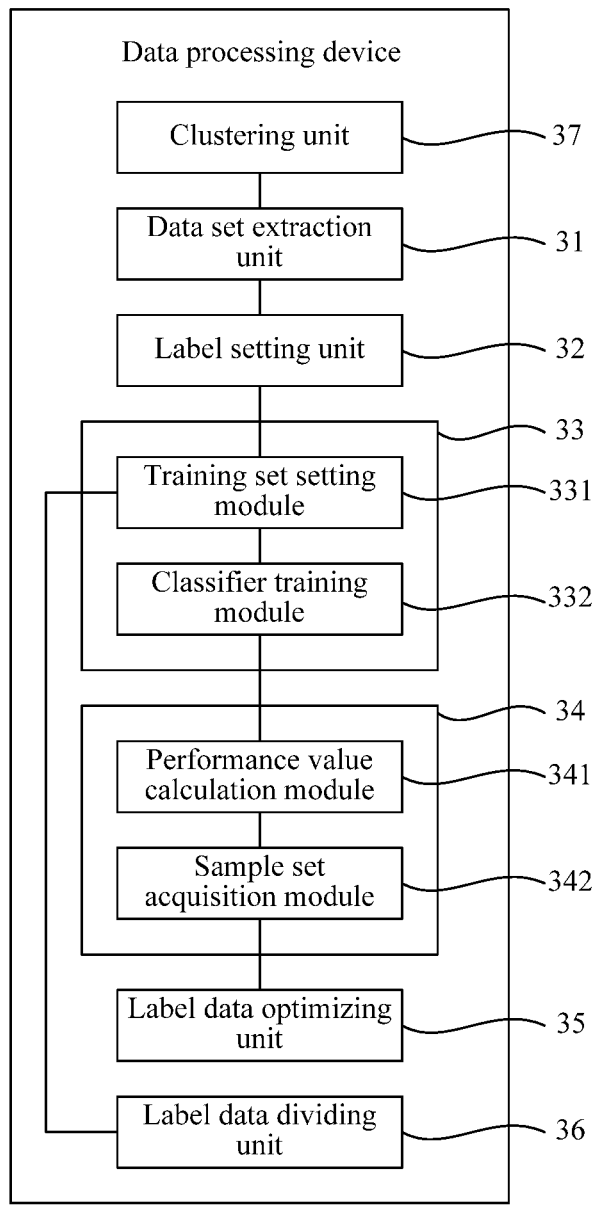
FIG. 4 is a structure diagram of another data processing device according to the embodiments of the present disclosure.

Referring to FIG. 4, FIG. 4 is a structure diagram of another data processing device according to the embodiments of the present disclosure. Compared with Embodiment 4, the data processing device of one embodiment includes: a data set extraction unit 31, a label setting unit 32, a training unit 33, a candidate sample obtaining unit 34, and a label data optimizing unit 35, and further includes: a labeled data dividing unit 36 and a clustering unit 37.

The clustering unit 37 is configured to cluster unlabeled data. When the number of unlabeled samples which need to be processed is very large, in order to save computing resources, one embodiment introduces a clustering algorithm. After clustering, the samples in each class are similar, and then the labels of data in each class are the same. In this way, the data set extraction unit 31 can extract a data sample from each class of unlabeled data, and form a data set with each of a preset number (namely a first preset number) of data samples.

The labeled data dividing unit 36 is configured to divide the labeled data into training sets for classifier training and testing sets for classifier testing according to a preset ratio.

The training unit 33 further includes: a training set setting module 331 and a classifier training module 332. The training set setting module 331 is configured to add data samples of each sample set in each group of data set to the training sets to form multiple new training sets. The classifier training module 332 is configured to train the classifiers through the multiple new training sets respectively.

The candidate sample obtaining unit 34 further includes: a performance value calculation module 341 and a sample set acquisition module 342. The performance value calculation module 341 is configured to calculate the AUC value of the classifiers trained by the multiple new training sets, that is, calculate the AUC value of each of the multiple classifiers trained by the multiple new training sets. The sample set acquisition module 342 is configured to obtain a sample set corresponding to the highest AUC value in each data set, and forms the candidate training set.

The data processing method of the disclosed embodiment fully considers the distribution of the unlabeled data. The essence is that the unlabeled data and the labeled data are put together for learning, so that the classifiers have better generalization ability.

The data processing method of the disclosed embodiment uses a large number of unlabeled data samples and adopts a heuristic traversal combined label idea, ensuring that the performances of the classifiers can be better after the introduction of the unlabeled samples.

The data processing method of the disclosed embodiment proposes an algorithm which combines clustering with semi-supervising for the situation when the number of unlabeled data is too large, greatly reducing the time complexity of classifier training.

Figure 5:
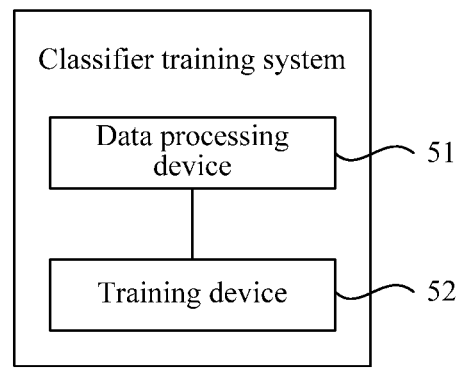
FIG. 5 is a structure diagram of a classifier training system according to the embodiments of the present disclosure.

One embodiment provides a classifier training system. Similarly, the system may also be electronic equipment such as a server or a user terminal. Referring to FIG. 5, the system includes a data processing device 51 and a training device 52. Firstly, the data processing device 51 is configured to repeatedly obtain data samples from unlabeled data and add the data samples to labeled data, and then, the training device 52 trains classifiers by using the labeled data including the data samples after adding the data samples to the labeled data each time. The data processing device 51 is the same as that of Embodiment 4 or Embodiment 5, which will not be described herein.

The classifier training system of the disclosed embodiment uses a large number of unlabeled data samples and adopts a heuristic traversal combined label idea, ensuring that the performances of the classifiers can be better after the introduction of the unlabeled samples. Different from a traditional semi-supervised model, the classifier training method of the disclosed embodiment does not consider the accuracy of specific labeling, and only considers whether the distribution of unlabeled samples can be used to improve the performances of the classifiers, it is guaranteed that the introduction of unlabeled data will not cause the deterioration of the performances of the classifiers, and the unlabeled data can be well used to improve the model classification effect. Therefore, the classifier training system of the disclosed embodiment is particularly suitable for a system which has a large number of unlabeled samples and an insufficient number of labeled samples. For example, by applying the classifier training method of the disclosed embodiment to a social credit investigation warning model, a lot of unlabeled data which is not utilized during the construction of the credit investigation warning model can be fully utilized to improve the performances of the classifiers, which further improves the ability of a bank to control credit and loan customers.

Through the foregoing description of the embodiments, those skilled in the art can clearly understand that the embodiments of the present disclosure may be implemented by hardware, and may also be implemented by means of software and a necessary general hardware platform. Based on such understanding, the technical solution of the present disclosure may be embodied in the form of a software product, and the software product may be stored in a non-volatile storage medium (which may be a CD-ROM, a USB flash disk, a mobile hard disk drive, etc.) and comprises a plurality of instructions for causing one computer device (which may be a personal computer, a server, or a network device, etc.) to perform the methods described in each implementation scenario of the embodiments of the present disclosure.

The above descriptions are merely preferred embodiments of the present application, and are not intended to limit the present application in any form. Although the present application has been disclosed above through the preferred embodiments, the embodiments are not intended to limit the present application. A person skilled in the art can make some equivalent variations, alterations or modifications to the above-disclosed technical content without departing from the scope of the technical solutions of the present application to obtain equivalent embodiments. Any simple alteration, equivalent change or modification made to the above embodiments according to the technical essence of the present disclosure without departing from the content of the technical solutions of the present disclosure shall fall within the scope of the technical solutions of the present application.

What is claimed is:

1. A data processing method, including:
    extracting, by a computing device, a plurality of data sets from unlabeled data, each data set including a first preset number of data samples;
    for each data set,
        creating, from the data set, a plurality of sample sets to be trained by randomly assigning labels to data samples in the data set, each sample set including the first preset number of data samples and respective labels of the first preset number of data samples, the labels of the data samples in each sample set constituting a label combination, and the plurality of the sample sets contain the same data samples of the data set and different label combinations assigned to the same data samples;
        respectively training, for each sample set created from the data set, a classifier by using the sample set and labeled data;
        obtaining a sample set that corresponds to a trained classifier with the highest performance among the plurality of sample sets created from the data set; and
        adding the obtained sample set to a candidate training set; and
    adding, by the computing device, a second preset number of sample sets in the candidate training set to the labeled data.

2. The data processing method according to claim 1, wherein before respectively training, for each sample set created from the data set, the classifier by using the sample set and the labeled data, the method further comprises:
    dividing the labeled data into a training set for classifier training and a testing set for classifier testing according to a preset ratio.

3. The data processing method according to claim 2, wherein respectively training, for each sample set created from the data set, the classifier comprises:

respectively adding each sample set created from the data set to the training set from the labeled data to form multiple new training sets; and training multiple classifiers using the multiple new training sets respectively.

4. The data processing method according to claim 3, wherein obtaining the sample set that corresponds to the trained classifier with the highest performance comprises:

calculating an AUC (Area Under Curve) value of each of the multiple classifiers trained by the multiple new training sets respectively, each AUC value corresponding to a sample set that is created from the data set and is included in one of the multiple new training sets used to train one of the multiple classifiers; and obtaining a sample set corresponding to the highest AUC value among the plurality of sample sets created from the data set as the sample set whose corresponding classifier has the highest performance.

5. The data processing method according to claim 1, wherein the second preset number of sample sets are a total number of sample sets in the candidate training set.

6. The data processing method according to claim 1, wherein extracting the plurality of data sets from unlabeled data comprises:

clustering the unlabeled data to obtain a plurality of clusters of the unlabeled data; and forming a data set by extracting one or more data samples from each cluster of the unlabeled data and forming the data set having the first preset number of data samples using the extracted one or more data samples.

7. The data processing method according to claim 1, further comprising:

repeatedly obtaining a batch of data samples from the unlabeled data and adding the sample sets in the candidate training set corresponding to the current batch of data samples to the labeled data; and training a current classifier by using the labeled data added with the sample sets the candidate training set corresponding to the current batch of data samples each time.

8. A data processing device, including:

one or more memories, and one or more processors, wherein the one or more processors are configured to:

extract a plurality of data sets from unlabeled data, each data set including a first preset number of data samples;

for each data set, creating, from the data set, a plurality of sample sets to be trained by randomly assigning labels to data samples in the data set, each sample set including the first preset number of data samples and respective labels of the first preset number of data samples, the labels of the data samples in each sample set constituting a label combination, and the plurality of the sample sets contain the same data samples of the data set and different label combinations assigned to the same data samples;

respectively train, for each sample set created from the data set, a classifier by using the sample set and labeled data;

obtain a sample set that corresponds to a trained classifier with the highest performance among the plurality of sample sets created from the data set; and add the obtained sample set to a candidate training set; and add a second preset number of sample sets in the candidate training set to the labeled data.

9. The data processing device according to claim 8, wherein the one or more processors are further configured to: before respectively training, for each sample set created from the data set, the classifier, divide the labeled data into a training set for classifier training and a testing set for classifier testing according to a preset ratio.

10. The data processing device according to claim 9, wherein the one or more processors are further configured to:

respectively add each sample set created from the data set to the training set from the labeled data to form multiple new training sets; and train multiple classifiers using the multiple new training sets respectively.

11. The data processing device according to claim 10, wherein the one or more processors are further configured to:

calculate an AUC (Area Under Curve) values of each of the multiple classifiers trained by the multiple new training sets respectively, each AUC value corresponding to a sample set that is created from the data set and is included in one of the multiple new training sets used to train one of the multiple classifiers; and acquire a sample set corresponding to the highest AUC value among the plurality of sample sets created from the data set as the sample set whose corresponding classifier has the highest performance.

12. The data processing device according to claim 8, wherein the one or more processors are further configured to add all the sample sets in the candidate training set to the labeled data.

13. The data processing device according to claim 8, wherein the one or more processors are further configured to:

cluster the unlabeled data to obtain a plurality of clusters of the unlabeled data; and form each of the plurality of data sets by extracting one or more data samples from each cluster of the unlabeled data, and forming the data set having the first preset number of data samples with the extracted one or more data samples.

14. The data processing device according to claim 8, wherein the one or more processors are further configured to:

repeatedly obtain a batch of data samples from the unlabeled data and add the sample sets in the candidate training set corresponding to the current batch of data samples to the labeled data, and train a current classifier by using the labeled data added with the sample sets from the candidate training set corresponding to the current batch of data samples each time.

15. A non-transitory, non-volatile computer-readable storage medium storing a computer program that, when being executed by at least one processor, cause the at least one processor to perform:

extracting a plurality of data sets from unlabeled data, each data set including a first preset number of data samples;

for each data set, creating, from the data set, a plurality of sample sets to be trained by randomly assigning labels to data samples in the data set, each sample set including the first preset number of data samples and respective labels of the first preset number of data samples, the labels of the data samples in each sample set constituting a label combination, and the plurality of the sample sets contain the same data samples of the data set and different label combinations assigned to the same data samples;

respectively training, for each sample set created from the data set, a classifier by using the sample set and labeled data;

obtaining a sample set that corresponds to a trained classifier with the highest performance among the plurality of sample sets created from the data set; and adding the obtained sample set to a candidate training set; and adding a second preset number of sample sets in the candidate training set to the labeled data.

16. The storage medium according to claim 15, wherein before respectively training, for each sample set created from the data set, the classifier by using the sample set and the labeled data, the computer program further cause the at least one processor to perform:

dividing the labeled data into a training set for classifier training and a testing set for classifier testing according to a preset ratio.

17. The storage medium according to claim 16, wherein respectively training, for each sample set created from the data set, the classifier comprises:

respectively adding each sample set created from the data set to the training set from the labeled data to form multiple new training sets; and training multiple classifiers using the multiple new training sets respectively.

18. The storage medium according to claim 17, wherein obtaining the sample set that corresponds to the trained classifier with the highest performance comprises:

calculating an AUC (Area Under Curve) value of each of the multiple classifiers trained by the multiple new training sets respectively, each AUC value corresponding to a sample set that is created from the data set and is included in one of the multiple new training sets used to train one of the multiple classifiers; and obtaining a sample set corresponding to the highest AUC value among the plurality of sample sets created from the data set as the sample set whose corresponding classifier has the highest performance.

19. The storage medium according to claim 15, wherein the second preset number of sample sets are a total number of sample sets in the candidate training set.

20. The storage medium according to claim 15, wherein extracting the plurality of data sets from unlabeled data comprises:

clustering the unlabeled data to obtain a plurality of clusters of the unlabeled data; and forming a data set by extracting one or more data samples from each cluster of the unlabeled data and forming the data set having the first preset number of data samples with the extracted one or more data samples.

* * * * *